United States Patent
Zhuang

(10) Patent No.: US 10,374,997 B2
(45) Date of Patent: Aug. 6, 2019

(54) SYSTEM AND METHOD FOR SPAM PREVENTION WITH GENERALIZED EMAIL ADDRESS

(71) Applicant: Min Zhuang, Apple Valley, MN (US)

(72) Inventor: Min Zhuang, Apple Valley, MN (US)

(*) Notice: Subject to any disclaimer, the term of this patent is extended or adjusted under 35 U.S.C. 154(b) by 332 days.

(21) Appl. No.: 15/232,241

(22) Filed: Aug. 9, 2016

(65) Prior Publication Data

US 2017/0063756 A1  Mar. 2, 2017

Related U.S. Application Data

(60) Provisional application No. 62/210,107, filed on Aug. 26, 2015.

(51) Int. Cl.
  *G06F 15/16* (2006.01)
  *H04L 12/58* (2006.01)
  *H04L 29/08* (2006.01)

(52) U.S. Cl.
  CPC ............ *H04L 51/12* (2013.01); *H04L 51/22* (2013.01); *H04L 51/08* (2013.01); *H04L 51/28* (2013.01); *H04L 67/306* (2013.01)

(58) Field of Classification Search
  None
  See application file for complete search history.

(56) References Cited

U.S. PATENT DOCUMENTS

| | | | | |
|---|---|---|---|---|
| 8,607,361 B2* | 12/2013 | Gillum | .......... | H04L 63/126 709/206 |
| 2007/0130464 A1* | 6/2007 | Swedor | .......... | H04L 63/0442 713/170 |
| 2007/0143407 A1* | 6/2007 | Avritch | .......... | G06Q 10/107 709/206 |
| 2011/0078175 A1* | 3/2011 | Rashad | .......... | G06F 17/30539 707/769 |
| 2011/0313874 A1* | 12/2011 | Hardie | .......... | H04W 4/02 705/26.1 |
| 2012/0290599 A1* | 11/2012 | Tian | .......... | G06F 17/30616 707/758 |
| 2013/0018958 A1* | 1/2013 | McConnell | .......... | G06Q 10/101 709/204 |

* cited by examiner

*Primary Examiner* — Kenny S Lin

(57) ABSTRACT

A method for using a unique identifier in the email address format (generalized email address) to prevent spam email from reaching an email system is described. According to one embodiment of the invention, a method for sending and receiving emails in the email system is provided. The method includes using any valid regular email address to send an email to a group of recipients by a sender of the system. If recipient's email address is not in the system, the recipient receives a request email via regular email service for joining the system. After joining the system, the recipient needs to make a contact connection with the sender for retrieving the email by using generalized email address. The spam email cannot reach the system that based on generalized email address.

20 Claims, 2 Drawing Sheets

SYSTEM AND METHOD FOR SPAM PREVENTION WITH GENERALIZED EMAIL ADDRESS

CROSS-REFERENCE TO RELATED APPLICATIONS

This application claims the benefit of U.S. Provisional Application No. 62/210,107, filed Aug. 26, 2015 by the present inventor.

FIELD OF THE INVENTION

This invention relates to electronic communication systems and more particularly to systems for controlling unknown sender and unwanted email.

BACKGROUND OF THE INVENTION

The following is a tabulation of some prior art that presently appears relevant:

| Patent Number | Kind Code | Issue Date | Patentee |
| --- | --- | --- | --- |
| 8,621,010 | B2 | 2013 Dec. 31 | William Brittles, Paul Andrew TITHERIDGE, Nathalie DE MEYER, Christopher MATTHEWSON, Simon GORMLEY |
| 7,617,284 | B2 | 2009 Nov. 10 | Goran Salamuniccar |
| 7,380,126 | B2 | 2008 May 27 | James D. Logan, Charles G. Call |
| 7,359,941 | B2 | 2008 Apr. 15 | Christopher Hoang Doan, Liliana Orozco |

Email is one of the most used forms of communication. However, majority emails received in the inbox are regular spam emails, known as unsolicited bulk emails. According to Cyren (www.cyren.com) 2015 CYBERTHREAT YEARBOOK, The amount of average spam per day is 54.6 billion in 2014. The highest amount of single day is 107.9 billion regular spam emails sent on the 2nd of August that year. For email users, not only reviewing and deleting these unwanted messages take long time, but also may receive viruses from unknown senders. Spam costs multibillion dollars each year in lost productivity.

For years, there are many technologies proposed to fight spam, such as filtering out unwanted email messages by using a filter constructed from a collective input of the reviewing group of users, using Secure Anti-Spam Email Protocol (SASEP), counting total number of email messages sent by sender in a predetermined time period, determining if a message has a valid message structure for the destination, and other approaches based on regular email services. The major problem with these approaches is that spammers can send unwanted regular email to other email recipients, yet the recipient has no effective way of controlling unknown senders and unwanted regular emails. More and more regular spam emails reflect that these technologies are not fully successful yet.

SUMMARY OF THE INVENTION

An object of the present invention is to create a computers-implemented method using an email system, available in both PCs and mobile devices, with a generalized email address configuration for preventing spam email from reaching the email system.

The generalized email address is a unique identifier in the email address format, used inside the email system. Once generalized, the email address lost its original meanings of local part and domain part separated by @ symbol. For example, emailuser@mydomain.com is used as a unique identifier inside the email system but it is a regular email address outside the email system.

Spammers send spam emails through regular email service by using local part and domain part of the email address to find recipients. The spam emails cannot reach the generalized email addresses inside the email system.

According to one embodiment, a sender in the email system can add any valid email address into a recipient email address list to send an email. Once the sender clicks the send button to submit the email, a controller, such as a software program written in Java, in the email system receives it and saves the email with any attachments into a database with a unique email id. By saving this email, the controller connects sender and recipient email addresses, email content, and attachments to the unique email id for late retrieval.

The controller then searches each recipient email address as generalized email address from a generalized email address table in the database. The search result indicates each recipient email address as an external recipient email address for the recipient email address not in the email system or an internal recipient email address for the recipient email address in the email system.

For each external recipient email address, the controller sends a join system request conventional email through external regular email service as a regular email. The controller inserts an online link and an offline QR code into the email to provide a link back to the email system for inviting the recipient to join. After joined the email system by creating a new user account with the recipient email address through a verification process, the recipient can connect with the sender. The recipient is now able to retrieve and reply the email after the contact connection established. The recipient email address becomes a generalized email address in the system. If the recipient is in the system already by using another email address, simply add the recipient email address to the account after the verification process.

For each internal recipient email address, the controller further determines whether a contact connection with the sender exists. If yes, the email is ready for the recipient to retrieve. If no, the controller issues a contact connection request for the recipient to accept and get connected, the email can be retrieved after the contact connection established. Either sender or recipient can delete the contact connection.

The email system provides ability to a group of administrators of the email system for enforcing system policies.

These and other embodiments of the invention along with many of its advantages and features are described in more detail in conjunction with the text below and attached figures.

BRIEF DESCRIPTION OF THE DRAWINGS

The accompanying drawings of email system configuration and flowchart illustrate one embodiment of the invention and together with the description, serve to explain the principles of the invention. The invention is not limited to the precise arrangements and instrumentalities shown.

DETAILED DESCRIPTION

The present invention is the method for using the generalized email address to send and receive email in the email system that can be used to prevent spam email from reaching the system. The email system provides additional advantages including secure email and large email attachment size.

The generalized email address is a unique identifier in the email address format without original local part and domain part meanings. Specifically, the email system can use any valid email address to send email. If recipient's email address is not in the email system, the recipient will receive the join system request regular email with link and QR code for retrieving the email. Users need to make contact connection first then communicate. A user's inbox contains emails only from other users in the contact connection list within the same email system.

Figure 1:
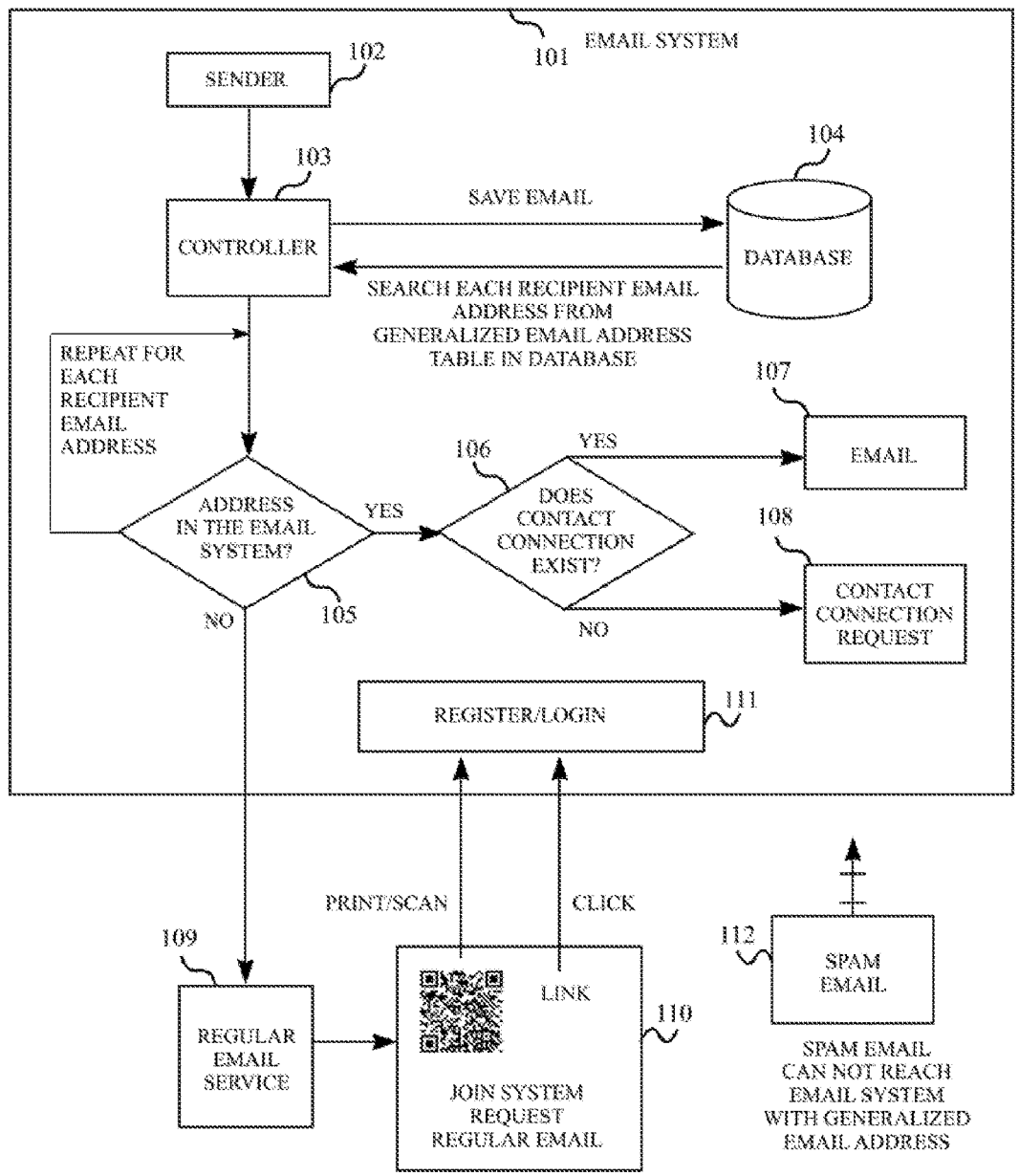
FIG. 1 illustrates the email system configuration for spam email prevention.

FIG. 1 is a schematic illustration of the method and system for spam email prevention according to an embodiment of the present invention. As shown in FIG. 1, email system 101, email sender 102, controller 103, such as the software program written in Java or a hardware processor, for receiving and processing email, database 104, determining the recipient email address in the email system 105, determining contact connection between sender and recipient of the recipient email address 106, email notification to retrieve email 107, contact connection request 108, external regular email service 109, join system request regular email with link and QR code 110, the email system's register/login page 111, spam email 112. Example of which is described in detail below:

When sending an email in the email system 101, the sender 102 can add any valid email address into a recipient list. Once the sender clicks the send button to submit the email, the controller 103 receives it and saves the email and any attachments into databases 104 with a new unique email id for late retrieval. The controller 103 searches each recipient email address as unique identifier in the generalized email address table in the database 104. With the search result, the controller 103 then determines each email address as an external recipient email address for the recipient email address not in the email system or an internal recipient email address for the recipient email address in the email system 105.

For each external recipient email address, the controller 103 sends the join system request regular email 110 through external regular email service 109 as regular email. The controller inserts the online link and offline QR code for printed email into the regular email 110 to provide the link back to the email system for inviting the recipient of the recipient email address to join. After joined the system through the verification process and establish contact connection with the sender, the recipient is now able to retrieve and reply the email. The recipient's email address becomes generalized email address in the system. If the recipient has an existing account by using another email address already, the recipient only needs to add the external recipient email address to the existing account after the verification process for retrieving email.

For each internal recipient email address, the controller 103 further determines whether the contact connection 106 exists between the sender and the email recipient, if the contact connection exists, the email 107 is ready for retrieval from the database 104. If the contact connection 106 does not exist, the controller issues the contact connection request 108 to let the recipient establish contact connection with the sender to retrieve the email. Either sender or recipient can delete the contact connection.

After the email sent, some recipient email addresses are not in the email system or not in the contact connection list, the controller 103 can send a confirmation message with the information to the sender at sender's preference.

Spam email 112 cannot reach the generalized email address because the local part and domain part of email address are not used inside the email system.

Figure 2:
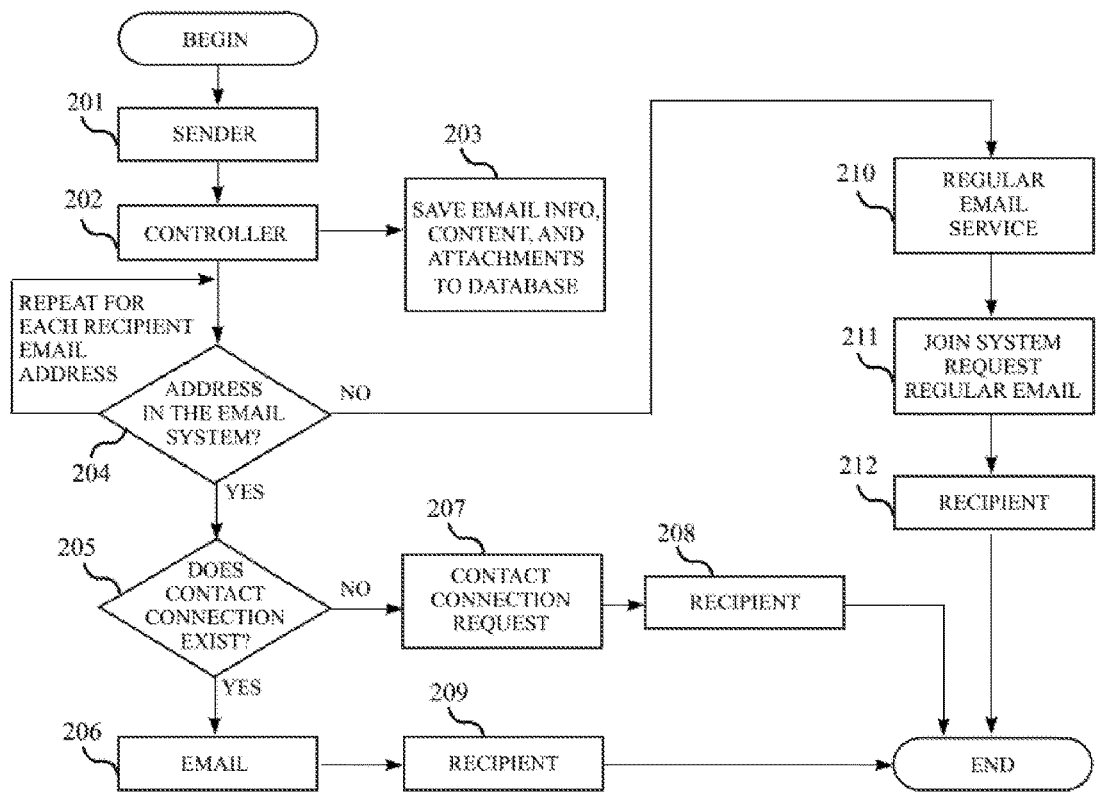
FIG. 2 shows a flowchart for sending an email by using the email system.

FIG. 2 is the flowchart of sending the email according to an embodiment of the present invention. As shown in FIG. 2:

In Step 201, the sender creates the email with or without attachments, and adds one or more of valid email addresses into a recipient email address list. Then sender clicks the send button.

In Step 202, the controller receives the email and any attachments.

In Step 203, the controller saves the email and any attachments into databases with a unique email id for late retrieval.

In Step 204, the controller searches each recipient email address as generalized email address in the generalized email address table in database. If a recipient email address found in the table, go to Step 205; if not in the table, the controller creates a join system request as a regular email then go to Step 210 until all recipient email addresses in the recipient email address list processed.

In Step 205, the controller determines whether the contact connection with the sender exists, if found, the controller makes the email 206 ready for retrieval, go to Step 209; if not found, the controller creates the contact connection request 207 for the recipient of the recipient email address, go to Step 208.

In Step 206, email notification in transition

In Step 207, contact connection request in transition

In Step 208, the recipient receives the contact connection request.

In Step 209, the recipient receives the email notification for retrieve email.

In Step 210, external regular email service processes the regular email with the join system request.

In Step 211, join system request in transition.

In Step 212, the recipient receives the join system request in the regular email.

Individual users can only register and generalize their multiple email addresses in known public email services, such as Gmail, Hotmail, and others to the system. Any email address entered should go through a verification process. A system generated secret code will be sent to user's email address, the user needs to retrieve the code and enters it online to prove that the user is the owner of this email account. All government, organization, and company's email accounts must be created by an authorized person from that organization to form an email group. The authorized person can create or delete contact connection between the group members. The email system will provide both individual login page and organization owner setup page.

Because this system can grow very large, the desired architecture of the system is a distributed system with scalability. Each user has a home server, all user data reside in the same server, so user's email are fully searchable in high speed. The system relies on the generalized email address table with user's home server information to per-form email functions. The domain part of generalized email address can be used for creating partitions for horizontal scaling: The main generalized email address table can be divided into a group of small tables according to the domain name. If one divided table still holds too many generalized email addresses, the divided table can be further divided by using the alphanumeric order of the local part of generalized email address until each divided table reaches an ideal size.

In another embodiment, a secure Web based system with a centralized database for storing user email address and home server information that can be created, retrieved, updated and deleted by using RESTful Web services. With this centralized information database implementation, emails and attachments stored in distributed home servers become RESTful resources that are available for all instances of the system to use, such as retrieving email by recipients. The system can achieve security through both the transport layer (SSL) and higher level mechanisms. Users are only allowed to see the information according to users' security authorization. Except public information, all other information is strictly confidential. Unlike regular email service passes email through many unknown email servers, the email system let recipient retrieve email directly from sender's home server that reduces many security leaking points and removed the email attachment size barrier.

In another embodiment, a set of system defined attributes enables users to enter their interested fields to receive emails from outside of their contact connection list, such as education, politics, medical, travel, sports, religion, car, and other field emails. These emails will be placed in a different email box other than the inbox. Each attribute has its own database table in the system for storing interested users' email address, such as basketball, car license plate, city, street, and others. For example, if a user enters car license plate number as an attribute, other users can notify the user by email if the car lights left on while in the parking lot. Another example, once a user enters street name and city where user's home located as attributes; the user can receive road work information about that street. These fields can be combined using the Boolean operators such as San Francisco AND democrat for sending campaign emails to a certain group. Users have option to remove any attribute when they don't like to receive information anymore. They also can place any individual sender to a block list if they don't like the sender.

Improvements and modifications can be made to the foregoing without departing from the scope of the present invention.

The invention claimed is:

1. A computers-implemented method using an email system based on unique identifier in email address format (generalized email address) for preventing spam email from reaching the email system, comprising:
   creating an email having zero or a plurality of attachment files by a sender of the email system to a plurality of recipient email addresses;
   generalizing both the sender email address and the plurality of recipient email addresses to generalized email addresses by removing the original meaning of local part and domain part from every email address;
   bypassing regular email gateways, regular email servers, and Simple Mail Transfer Protocol (SMTP) to send the email having zero or a plurality of attachment files to a controller;
   saving the email having zero or a plurality of attachment files with a unique email id to a database in the email system for later retrieval;
   searching each recipient generalized email address in a generalized email address table in the database to create a search result;
   determining each recipient generalized email address as an external recipient generalized email address for the recipient generalized email address not in the email system or an internal recipient generalized email address for the recipient generalized email address in the email system based on the search result;
   restoring the sender generalized email address and each external recipient generalized email address to regular email address by adding the original meaning of local part and domain part;
   sending a regular email of join system request to each external recipient regular email address through the regular email service;
   verifying a contact connection with the sender for each recipient of the internal recipient generalized email addresses;
   issuing the contact connection request to each internal recipient generalized email address if the recipient of the internal recipient generalized email address has no contact connection with the sender;
   allowing each recipient in the email system to establish contact connection with the sender if the recipient has no contact connection with the sender;
   forwarding a notification of the email having zero or a plurality of attachment files to each internal recipient generalized email address if the recipient of the internal recipient generalized email address has the contact connection with the sender;
   omitting regular email gateways, regular email servers, Post Office Protocol 3 (POP3), and Internet Message Access Protocol (IMAP) to let each recipient of the internal recipient generalized email addresses retrieve the email having zero or a plurality of attachment files with the unique email id directly from the controller if the recipient has the contact connection with the sender.

2. The method as claimed in claim 1, wherein the regular email of join system request is an email having a link to the email system with the recipient regular email address embedded in the link.

3. The method as claimed in claim 1, wherein the regular email of join system request is an email having a Quick Response (QR) code containing a link to the email system with the recipient regular email address.

4. The method as claimed in claim 1, wherein the controller is a software program or a hardware processor for receiving, processing, and letting recipients retrieve emails having generalized email addresses.

5. The method as claimed in claim 1, wherein the regular email service is using standard email protocols SMTP, POP3 and IMAP.

6. The method as claimed in claim 1, wherein the email system is based on RESTFul resources communicating over Hypertext Transfer Protocol (HTTP) to send and retrieve emails having generalized email addresses.

7. The method as claimed in claim 1, wherein the contact connection can be set by the owner of an email group having generalized email addresses for its members.

8. The method as claimed in claim 1, wherein the generalized email address table further comprises using a group of generalized email address tables organized according to the text of domain part and local part of the generalized email address format in the database of the email system.

9. The method as claimed in claim 1, wherein the email system further comprises providing ability to a group of administrators of the email system for enforcing system policies.

10. The method as claimed in claim 1, wherein the email system further comprises a set of system or user defined attributes as user interested topics for receiving emails having generalized email addresses without the contact connection.

11. An email system based on unique identifier in email address format (generalized email address) for preventing spam email from reaching the email system, comprising:

creating means for creating an email having zero or a plurality of attachment files by a sender of the email system to a plurality of recipient email addresses;

generalizing means for generalizing both the sender email address and the plurality of recipient email addresses to generalized email addresses by removing the original meaning of local part and domain part from every email address;

bypassing means for bypassing regular email gateways, regular email servers, and Simple Mail Transfer Protocol (SMTP) to send the email having zero or a plurality of attachment files to a controller;

saving means for saving the email having zero or a plurality of attachment files with a unique email id to a database in the email system for later retrieval;

searching means for searching each recipient generalized email address in a generalized email address table in the database to create a search result;

determining generalized email address means for determining each recipient generalized email address as an external recipient generalized email address for the recipient generalized email address not in the email system or an internal recipient generalized email address for the recipient generalized email address in the email system based on the search result;

restoring means for restoring the sender generalized email address and each external recipient generalized email address to regular email address by adding the original meaning of local part and domain part;

sending means for sending a regular email of join system request to each external recipient regular email address through the regular email service;

verifying contact connection means for verifying a contact connection with the sender for each recipient of the internal recipient generalized email addresses;

issuing means for issuing the contact connection request to each internal recipient generalized email address if the recipient of the internal recipient generalized email address has no contact connection with the sender;

allowing means for allowing each recipient in the email system to establish contact connection with the sender if the recipient has no contact connection with the sender;

forwarding means for forwarding a notification of the email having zero or a plurality of attachment files to each internal recipient generalized email address if the recipient of the internal recipient generalized email address has the contact connection with the sender;

omitting means for omitting regular email gateways, regular email servers, Post Office Protocol 3 (POP3), and Internet Message Access Protocol (IMAP) to let each recipient of the internal recipient generalized email addresses retrieve the email having zero or a plurality of attachment files with the unique email id directly from the controller if the recipient has the contact connection with the sender.

12. The email system as claimed in claim 11, wherein the regular email of join system request is an email having a link to the email system with the recipient regular email address embedded in the link.

13. The email system as claimed in claim 11, wherein the regular email of join system request is an email having a Quick Response (QR) code containing a link to the email system with the recipient regular email address.

14. The email system as claimed in claim 11, wherein the controller is a software program or a hardware processor for receiving, processing, and letting recipients retrieve emails having generalized email addresses.

15. The email system as claimed in claim 11, wherein the regular email service is using standard email protocols SMTP, POP3 and IMAP.

16. The email system as claimed in claim 11, wherein the email system is based on RESTFul resources communicating over Hypertext Transfer Protocol (HTTP) to send and retrieve emails having generalized email addresses.

17. The email system as claimed in claim 11, wherein the contact connection can be set by the owner of an email group having generalized email addresses for its members.

18. The email system as claimed in claim 11, wherein the generalized email address table further comprises using a group of generalized email address tables organized according to the text of domain part and local part of the generalized email address format in the database of the email system.

19. The email system as claimed in claim 11, wherein the email system further comprises providing ability to a group of administrators of the email system for enforcing system policies.

20. The email system as claimed in claim 11, wherein the email system further comprises a set of system or user defined attributes as user interested topics for receiving emails having generalized email addresses without the contact connection.

* * * * *